United States Patent Office

3,499,025
Patented Mar. 3, 1970

---

3,499,025
METHOD FOR PRODUCING ACRYLONITRILE AND METHACRYLONITRILE
Charles L. Thomas, Swarthmore, Pa., assignor to Sun Oil Company, Philadelphia, Pa., a corporation of New Jersey
No Drawing. Filed Sept. 6, 1967, Ser. No. 665,723
Int. Cl. C07c *121/32, 121/04, 45/02*
U.S. Cl. 260—465.3         4 Claims

---

ABSTRACT OF THE DISCLOSURE

Acrylonitrile and methacrylonitrile are prepared by reacting propylene and isobutylene respectively with air or oxygen in the presence of a slight excess of ammonia over a platinum catalyst in the form of a metallic gauze at temperatures of from 750°–1000° C. for contact times of less than 0.1 second.

---

BACKGROUND OF THE INVENTION

This invention relates to an improved process for the preparation of aliphatic nitriles, and particularly acrylonitrile and methacrylonitrile, by the high temperature oxidation of olefins in the presence of ammonia over a platinum catalyst in the form of a metallic gauze.

The preparation of aliphatic nitriles, such as acrylonitrile, by oxidizing olefins with air or oxygen in the presence of ammonia is already known in the art. Thus, for example, in each of U.S. Patents No. 2,481,826; 2,904,-580; and 3,156,735 there is described a method of preparing acrylonitrile by reacting air or oxygen with propylene and ammonia in the presence of a particular oxidation catalyst. In each case, however, the catalyst is a highly complex mixture of metals and/or metal oxides or salts incorporated on a conventional support material such as fused alumina, fused silica, or the like. Although U.S. Patent No. 2,481,826 suggests that a catalyst need not necessarily be used, it is evident that the described process is not very effective without one. Therefore, it is evident that the prior art has only contemplated the use of highly complex oxidation catalysts as being satisfactory for the preparation of acrylonitrile from propylene, oxygen, and ammonia. Such catalysts are not only costly and complicated to prepare, but also they must be employed in pelletized form in cumbersome fixed or fluidized beds. Moreover, for economic reasons, such catalysts must be removed from the reactors from time to time to be regenerated, which is also a costly operation. Finally, it is evident that heat must constantly be supplied to the reaction, generally by preheating the feed, and that the external walls of the reactor must be cooled in order that the heat of reaction not rise above the melting point of the metals in the catalyst composition.

It is therefore an object of this invention to provide an improved process for preparing aliphatic nitriles from olefins, utilizing a catalyst system which will avoid certain of the aforementioned disadvantages inherent in these prior art methods. More particularly, it is an object of this invention to provide a process for the preparation of acrylonitrile and methacrylonitrile wherein there is employed a self-sustaining oxidation reaction, using a simple metal catalyst which does not require regeneration, yet which permits the use of extremely high space velocities of feed input together with contact times as low as 0.0001 second.

SUMMARY OF THE INVENTION

In accordance with the present invention, it has now been found that aliphatic nitriles, and particularly acrylonitrile and methacrylonitrile, may be prepared by passing a mixture of an olefin, oxygen or air, and ammonia over a platinum catalyst which is in the form of a metallic gauze at temperatures of from about 750° C. to 1000° C. for contact times of less than 0.1 second. The reaction products may then be readily recovered by quenching them immediately downstream of the catalyst gauze by injecting a suitable coolant, followed by distillation of the resulting mixture.

DESCRIPTION OF THE PREFERRED EMBODIMENTS

In carrying out the process of this invention, a variety of reactors may be employed. One such type of reactor which may be adapted for use in the instant process is described in Kirk-Othmer's "Encyclopedia of Chemical Technology," volume 9 (1952), at page 334, where a horizontally disposed converter is provided inside with horizontal layers of platinum gauze which can be electrically heated. Suitable means for introducing and mixing the olefins and air or oxygen, and ammonia and conventional quenching means may be readily provided using devices known to those skilled in the art.

The catalyst, which is preferably platinum, or a 90:10 mixture by weight of platinum and rhodium, in the form of layers of metallic gauze, or screen, is equipped with heating elements for starting the reaction. The layers generally total anywhere from about 5 to 20 in number, and may be placed about 0.01 inch apart. The average mesh size of the platinum gauze is about 80–100 mesh. It should be noted that applicant's process, utilizing this type of catalyst is particularly advantageous in that it is in a convenient form for handling and placing in the reactor as contrasted with pelletized catalysts which must be arranged in the form of beds and the like. Also, this process is especially advantageous in that the reaction may proceed for several days without interruption inasmuch as conventional catalyst regeneration is unnecessary.

To start the reaction the gauze is first heated to reaction temperature, and the mixture of olefin and air or oxygen and ammonia is then supplied to the reactor. Thereafter, the exothermic reaction on the surface of the gauze provides sufficient heat to keep the catalyst at reaction temperature, so that the electricity may be turned off. It is thus a particular advantage of this process that aside from the initial heating of the catalyst gauze, no additional external heat need be supplied to the reactor. Instead, the reaction is self-sustaining, and no added heating or cooling of the reactor is necessary. However, if desired, the feed may be preheated by recycling the hot products through an appropriate heat exchanger.

The products are then readily recovered by quenching the reactor effluent immediately downstream of the catalyst gauze or heat exchanger by the injection of a suitable coolant such as ammonia or the olefin starting material itself. The acrylonitrile or methacrylonitrile product may then be recovered from the coolant by distillation.

The olefins employed in the process of this invention are those containing three (3) to four (4) carbon atoms, i.e. propylene and isobutylene, from which are obtained, respectively, acrylonitrile and methacrylonitrile.

The molecular ratio of olefin to oxygen may be varied over limits ranging from 2:3 to 4:3 and preferably should be from 2.5:3 to 3.5:3. It is essential that at least three parts of oxygen or air per four parts of olefin be employed inasmuch as at lower ratios there will not be sufficient oxygen present to provide enough heat to maintain a self-sustaining oxidation reaction. Moreover, when the ratio of olefin to oxygen drops below about 2:3, there is produced increasing amounts of carbon monoxide and water. It will be understood, of course, that air may be used instead of pure oxygen.

The molecular ratio of olefin to ammonia should be such as to provide at least a slight excess of ammonia over olefin. Molecular ratios of olefin to ammonia may thus range from 1:1 to 1:2, and preferably should be from 1.1:1 to 1.5:1. When the amount of ammonia drops below that of the olefin, there is produced instead increasing amounts of by-products, such as acrolein or methacrolein.

The reaction temperatures employed are desirably in the range of from about 750°–1000° C., and preferably are from 800° to 900° C., while the contact time of the feed with catalyst is generally less than 0.1 second, and may be as low as 0.0001 second. The process is generally operated at atmospheric pressure, but pressures ranging from five (5) atmospheres to fifty (50) mm. of mercury may be employed if desired.

The extremely fast reaction rate resulting from the combination of the high temperatures and short contact times described above, together with the use of a metallic gauze catalyst, makes it possible to obtain very high space velocities in carrying out this process, and therefore, higher yields. By space velocities is meant the relationship of volumes of gas per volume of catalyst per hour. Thus, for example, space velocities in the range of from 5,000 to 10,000 volumes are possible when utilizing optimum operating conditions.

The following examples are included to further illustrate the present invention.

EXAMPLE 1

A reactor is provided with a catalyst consisting of ninety parts by weight of platinum and ten parts by weight of rhodium. The catalyst is in the form of 100-mesh gauze made from wire 0.003 inch in diameter, and is horizontally disposed in the reactor in five layers spread 0.01 inch apart. The catalyst is heated electrically to 950° C., and a feed comprising 2.5 volumes of propylene, 2.6 volumes of ammonia, and 3 volumes of oxygen is introduced into one end of the reactor. The gaseous mixture, which has been preheated to 500° C., is passed over the catalyst at a linear velocity of five feet per second for a contact time of 0.001 of a second. The electricity is turned off, and the self-sustaining reaction is continued in the presence of the glowing gauze catalyst for ten days. The effluent gases are rapidly quenched with propylene, and the acrylonitrile recovered by absorption and distillation. The unreacted and the quench propylene are recycled.

EXAMPLE 2

2.4 volumes of isobutylene and 15 volumes of air are charged to the reactor described in Example 1 together with 2.6 volumes of ammonia. The catalyst is heated electrically to a temperature of 850° C., and after the reaction has been initiated, it is turned off. The feed is passed over the glowing catalyst at a linear velocity of six feet per second for a period of five days. The effluent gases are quenched with steam, methacrylonitrile is recovered from the resulting solution by distillation, and the unreacted isobutylene is recycled to the reactor.

EXAMPLE 3

Repeating the process of Example 1, but utilizing a feed consisting of six volumes of propylene, seven volumes of ammonia, and one volume of oxygen, it is found that as soon as the electricity to the catalyst gauze is turned off, the gauze stops glowing and the reaction stops.

What is claimed is:

1. A process for the preparation of acrylonitrile or methacrylonitrile which comprises contacting propylene or isobutylene respectively with ammonia, and oxygen or air, in the presence of a catalyst consisting of platinum or a 90:10 mixture by weight of platinum and rhodium in the form of a metallic gauze screen at a temperature of about 750–1000° C. for a contact time of less than about 0.1 second.

2. The process according to claim 1 wherein the molecular ratio of propylene or isobutylene to oxygen is from about 2:3 to 4:3, and the ratio of propylene or isobutylene to ammonia is from about 1:1 to 1:2.

3. A process for the preparation of acrylonitrile which comprises contacting a mixture comprising propylene, oxygen and ammonia with a catalyst consisting of platinum or a 90:10 mixture by weight of platinum and rhodium in the form of a metallic gauze screen at a temperature of about 750–1000° C. for a contact time of between about 0.0001 second and 0.1 second, wherein the ratio of propylene to ammonia is about 1:1 and the ratio of propylene to oxygen is about 2.5:3.

4. A process for the preparation of methacrylonitrile which comprises contacting a mixture comprising isobutylene, oxygen and ammonia with a catalyst consisting of platinum or a 90:10 mixture of platinum and rhodium in the form of a metallic gauze screen at a temperature of about 750–1000° C. for a contact time of between about 0.0001 second and 0.1 second, wherein the ratio of isobutylene to ammonia is about 1:1 and the ratio of isobutylene to oxygen is about 2.5:3.

References Cited

UNITED STATES PATENTS

| | | | |
|---|---|---|---|
| 2,701,260 | 2/1955 | Hagemeyer | 260—465.9 |
| 3,009,943 | 11/1961 | Hadley et al. | 260—465.3 |
| 3,156,735 | 11/1964 | Armstrong | 260—465.3 XR |
| 3,328,315 | 6/1967 | Callahan et al. | 260—465.3 XR |

JOSEPH P. BRUST, Primary Examiner

U.S. Cl. X.R.

260—604